US012680883B2

(12) United States Patent
Tanaka et al.

(10) Patent No.: US 12,680,883 B2
(45) Date of Patent: Jul. 14, 2026

(54) TEMPERATURE ESTIMATION METHOD, TEMPERATURE ESTIMATION PROGRAM AND TEMPERATURE ESTIMATION DEVICE

(71) Applicant: NTT, Inc., Tokyo (JP)

(72) Inventors: Yujiro Tanaka, Tokyo (JP); Daichi Matsunaga, Tokyo (JP)

(73) Assignee: NTT, Inc., Tokyo (JP)

( * ) Notice: Subject to any disclaimer, the term of this patent is extended or adjusted under 35 U.S.C. 154(b) by 424 days.

(21) Appl. No.: 18/548,681

(22) PCT Filed: Mar. 10, 2021

(86) PCT No.: PCT/JP2021/009509
§ 371 (c)(1),
(2) Date: Sep. 1, 2023

(87) PCT Pub. No.: WO2022/190255
PCT Pub. Date: Sep. 15, 2022

(65) Prior Publication Data
US 2024/0159595 A1 May 16, 2024

(51) Int. Cl.
*G01K 1/20* (2006.01)
*G01K 1/02* (2021.01)
(Continued)

(52) U.S. Cl.
CPC ............... *G01K 1/20* (2013.01); *G01K 1/022* (2013.01); *G01K 1/026* (2013.01); *G01K 3/10* (2013.01);
(Continued)

(58) Field of Classification Search
CPC .......... G01K 1/20; G01K 1/022; G01K 1/026; G01K 3/10; G01K 7/427; G01K 13/20; G01K 3/14; G01K 7/42
See application file for complete search history.

(56) References Cited

U.S. PATENT DOCUMENTS 5,738,441 A * 4/1998 Cambridge .............. G01K 7/42
374/102
5,816,706 A * 10/1998 Heikkila .................. G01K 1/16
374/134
(Continued)

FOREIGN PATENT DOCUMENTS

JP 2020003291 A 1/2020

*Primary Examiner* — Nathaniel T Woodward
*Assistant Examiner* — Philip L Cotey
(74) *Attorney, Agent, or Firm* — Slater Matsil, LLP

(57) ABSTRACT
A temperature estimation apparatus includes a temperature calculation unit that calculates a core body temperature of a living body, a transient response detection unit that detects a starting point of time of transient response of the core body temperature, a correction section determination unit that determines a correction section of the core body temperature for each of a plurality of model functions that model a change in the core body temperature during a transient response, a temperature correction unit that calculates a result of correcting the core body temperature in the correction section using the plurality of model functions, a correction result evaluation unit that evaluates a correction result, and a correction result output unit that replaces data in the correction section among time-series data of the core body temperature with a correction result determined to be the best by the correction result evaluation unit.

17 Claims, 15 Drawing Sheets

(51) Int. Cl.

| | |
|---|---|
| *G01K 1/022* | (2021.01) |
| *G01K 3/10* | (2006.01) |
| *G01K 7/42* | (2006.01) |
| *G01K 13/20* | (2021.01) |
| *G01K 3/14* | (2006.01) |

(52) U.S. Cl.
CPC ............. *G01K 7/427* (2013.01); *G01K 13/20* (2021.01); *G01K 3/14* (2013.01); *G01K 7/42* (2013.01)

(56)                    References Cited

U.S. PATENT DOCUMENTS

| | | | | |
|---|---|---|---|---|
| 7,725,286 | B2 * | 5/2010 | Koch ..................... | G01K 1/165 |
| | | | | 600/549 |
| 10,175,120 | B2 * | 1/2019 | Nakagawa .............. | G01K 7/02 |
| 10,551,252 | B2 * | 2/2020 | Nakagawa ............. | G01K 7/427 |
| 11,064,953 | B1 * | 7/2021 | Al Anezi ............. | A61B 5/0008 |
| 2006/0056487 | A1 * | 3/2006 | Kuroda .................. | G01K 1/165 |
| | | | | 374/E7.042 |
| 2015/0055681 | A1 * | 2/2015 | Tsuchida ................ | G01K 13/20 |
| | | | | 374/183 |
| 2015/0168470 | A1 * | 6/2015 | Dougherty ............. | G01K 7/427 |
| | | | | 702/130 |
| 2015/0313474 | A1 * | 11/2015 | Goto .................... | A61B 5/6833 |
| | | | | 600/549 |
| 2017/0184523 | A1 * | 6/2017 | Ikeda ..................... | G01N 25/20 |
| 2019/0072606 | A1 * | 3/2019 | Blackmore ........ | G01R 31/2874 |
| 2019/0293494 | A1 * | 9/2019 | Mao ......................... | G01K 3/06 |
| 2021/0025766 | A1 * | 1/2021 | Turner .................. | H03H 17/04 |
| 2021/0096032 | A1 * | 4/2021 | Lane .................. | G01K 13/223 |
| 2021/0186337 | A1 * | 6/2021 | Matsunaga .............. | A61B 5/01 |
| 2021/0240217 | A1 * | 8/2021 | Thrasher ................. | G06F 1/08 |
| 2021/0275030 | A1 * | 9/2021 | Ghoreyshi ............. | A61B 5/746 |
| 2022/0136909 | A1 * | 5/2022 | Kim ...................... | G01K 7/425 |
| | | | | 702/136 |
| 2022/0160239 | A1 * | 5/2022 | Nam ..................... | G01K 13/20 |

* cited by examiner

Fig. 3

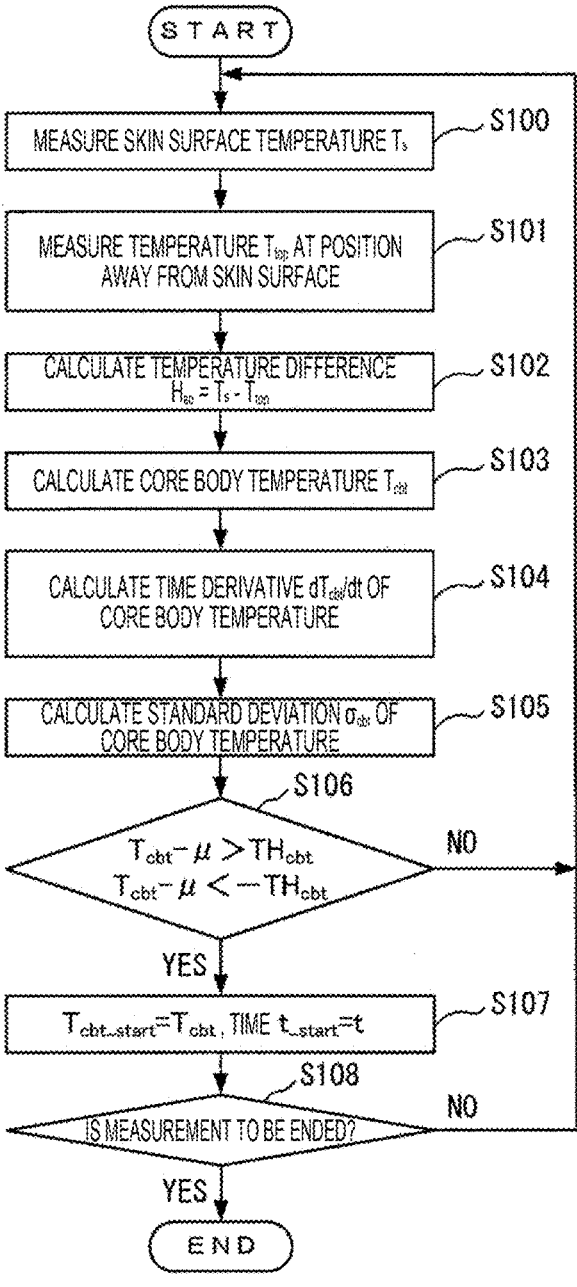

START

S100 — MEASURE SKIN SURFACE TEMPERATURE $T_s$

S101 — MEASURE TEMPERATURE $T_{sp}$ AT POSITION AWAY FROM SKIN SURFACE

S102 — CALCULATE TEMPERATURE DIFFERENCE $H_{sp} = T_s - T_{sp}$

S103 — CALCULATE CORE BODY TEMPERATURE $T_{cbt}$

S104 — CALCULATE TIME DERIVATIVE $dT_{cbt}/dt$ OF CORE BODY TEMPERATURE

S105 — CALCULATE STANDARD DEVIATION $\sigma_{cbt}$ OF CORE BODY TEMPERATURE

S106 — $T_{cbt} - \mu > TH_{cbt}$ $T_{cbt} - \mu < -TH_{cbt}$    NO

YES

S107 — $T_{cbt\_start} = T_{cbt}$, TIME $t_{\_start} = t$

S108 — IS MEASUREMENT TO BE ENDED?    NO

YES

END

TEMPERATURE ESTIMATION METHOD, TEMPERATURE ESTIMATION PROGRAM AND TEMPERATURE ESTIMATION DEVICE

CROSS-REFERENCE TO RELATED APPLICATIONS

This application is a national phase entry of PCT Application No. PCT/JP2021/009509, filed on Mar. 10, 2021, which application is hereby incorporated herein by reference.

TECHNICAL FIELD

The present invention relates to a temperature estimation method, a temperature estimation program, and a temperature estimation apparatus for estimating an internal temperature of a test subject such as a living body.

BACKGROUND

Conventionally, as a method for estimating a core body temperature of a living body, an in-vivo temperature estimation method disclosed in Patent Literature 1 is known. The method disclosed in Patent Literature 1 estimates a core body temperature $T_{cbt}$ of a living body 100 using a thermal equivalent circuit model of the living body 100 and a sensor 101 as illustrated in FIG. 11. The sensor 101 measures a skin surface temperature $T_s$ and a skin surface heat flux $H_{so}$ of the living body 100. $T_{top}$ denotes a temperature of an upper surface of the sensor 101 on a side opposite to the surface that comes into contact with the skin of the living body 100, $T_{Air}$ denotes an external air temperature, $R_b$ denotes a thermal resistance of the living body 100, $R_s$ denotes a thermal resistance of the sensor 101, and $R_A$ denotes a thermal resistance of external air. Equation 1 for estimating the core body temperature $T_{cbt}$ is as described below.

$$\text{Equation 1: } T_{cbt}=T_s+R_b\times H_{so} \tag{1}$$

The heat flux $H_{so}$ of the skin surface is expressed by Equation 2 described below.

$$\text{Equation 2: } H_{so}=(T_s-T_{top})/R_s \tag{2}$$

However, in the estimation method disclosed in Patent Literature 1, since it is assumed that heat is constantly transported to the external air, a transient error occurs in the estimated temperature when wind is blown to the living body by an electric fan or the like, the living body runs, or the living body suddenly moves from a warm room to a cold room.

FIG. 12 illustrates a comparison between a true core body temperature $T_t$ and an estimated temperature $T_{cbt}$ when wind is blown to the living body by an electric fan. The error between the true core body temperature $T_t$ and the estimated temperature $T_{cbt}$ occurs because there is a difference in time until the temperature $T_{top}$ of the upper surface of the sensor and the skin temperature $T_s$ each settle to a steady state when the wind is blown to the living body. As described above, the estimation method disclosed in Patent Literature 1 has a problem that an error occurs in the estimation of the core body temperature $T_{cbt}$.

CITATION LIST

Patent Literature

Patent Literature 1: JP 2020-003291 A

SUMMARY

Technical Problem

Embodiments of the present invention have been made in order to solve the above problem, and an object thereof is to provide a temperature estimation method, a temperature estimation program, and a temperature estimation apparatus capable of reducing an estimation error of an internal temperature of a test subject such as a living body.

Solution to Problem

A temperature estimation method of embodiments of the present invention includes: a first step of measuring a temperature of a surface of a test subject using a first temperature sensor; a second step of measuring a temperature at a position away from the test subject using a second temperature sensor; a third step of calculating an internal temperature of the test subject on the basis of measurement results of the first and second temperature sensors; a fourth step of detecting a starting point of time of transient response of the internal temperature; a fifth step of obtaining coefficients of each of a plurality of model functions that model a change in the internal temperature during a transient response for a part of a coefficient calculation section from the starting point of time of the transient response until a predetermined transient response convergence evaluation time elapses; a sixth step of determining a correction section of the internal temperature for each of the plurality of model functions; a seventh step of calculating a result of correcting the internal temperature in the correction section using each of the plurality of model functions; an eighth step of evaluating the correction results of the seventh step; and a ninth step of replacing data in the correction section among time-series data of the internal temperature with the correction result determined to be best in the eighth step.

Further, in one configuration example of the temperature estimation method of embodiments of the present invention, the plurality of model functions include a model function that models a change in internal temperature during a transient response in which wind blown to the test subject has changed, and a model function that models a change in internal temperature during a transient response in which the external air temperature has changed.

Further, in one configuration example of the temperature estimation method of embodiments of the present invention, the fifth step includes a step of obtaining the coefficient such that a difference between the internal temperature and an output of the model function is minimized for each of the plurality of model functions.

Further, in one configuration example of the temperature estimation method of embodiments of the present invention, the coefficient calculation section is a section from an intermediate value between a peak value of the internal temperature and the internal temperature at the starting point of time of the transient response to the peak value.

Further, in one configuration example of the temperature estimation method of embodiments of the present invention, the sixth step includes a step of obtaining a first approximate straight line of the internal temperature immediately before the starting point of time of transient response and a second approximate straight line of the internal temperature from the starting point of time of the transient response until the transient response convergence evaluation time lapses, and regarding each of the plurality of model functions, setting a section between two intersection points of the first and second approximate straight lines and an output of the model function, as the correction section.

Further, in one configuration example of the temperature estimation method of embodiments of the present invention, the eighth step includes a step of calculating an evaluation value for each of correction results using the plurality of model functions, and setting a minimum evaluation value as a best correction result.

Further, the temperature estimation program of embodiments of the present invention causes a computer to execute the second to ninth steps.

Further, a temperature estimation apparatus of embodiments of the present invention includes: a first temperature sensor configured to measure a temperature of a surface of a test subject; a second temperature sensor configured to measure a temperature at a position away from the test subject; a temperature calculation unit configured to calculate an internal temperature of the test subject on the basis of measurement results of the first and second temperature sensors; a transient response detection unit configured to detect a starting point of time of transient response of the internal temperature; a coefficient calculation unit configured to obtain coefficients of each of a plurality of model functions that model a change in the internal temperature during a transient response for a part of a coefficient calculation section from the starting point of time of the transient response until a predetermined transient response convergence evaluation time elapses; a correction section determination unit configured to determine a correction section of the internal temperature for each of the plurality of model functions; a temperature correction unit configured to calculate a result of correcting the internal temperature in the correction section using each of the plurality of model functions; a correction result evaluation unit configured to evaluate a correction result from the temperature correction unit; and a correction result output unit configured to replace data in the correction section among time-series data of the internal temperature with the correction result determined to be best by the correction result evaluation unit.

Advantageous Effects of Embodiments of the Invention

According to embodiments of the present invention, it is possible to eliminate the influence of wind and external air temperature and to reduce an estimation error of the internal temperature of the test subject.

BRIEF DESCRIPTION OF THE DRAWINGS

FIG. 3 is a flowchart for describing an operation of the temperature estimation apparatus according to an embodiment of the present invention.

FIGS. 6A and 6B are diagrams illustrating one example of a standard deviation and an average of a core body temperature in a case where there is no change in wind blown to a living body or an external air temperature.

DETAILED DESCRIPTION OF ILLUSTRATIVE EMBODIMENTS

Figure 1:
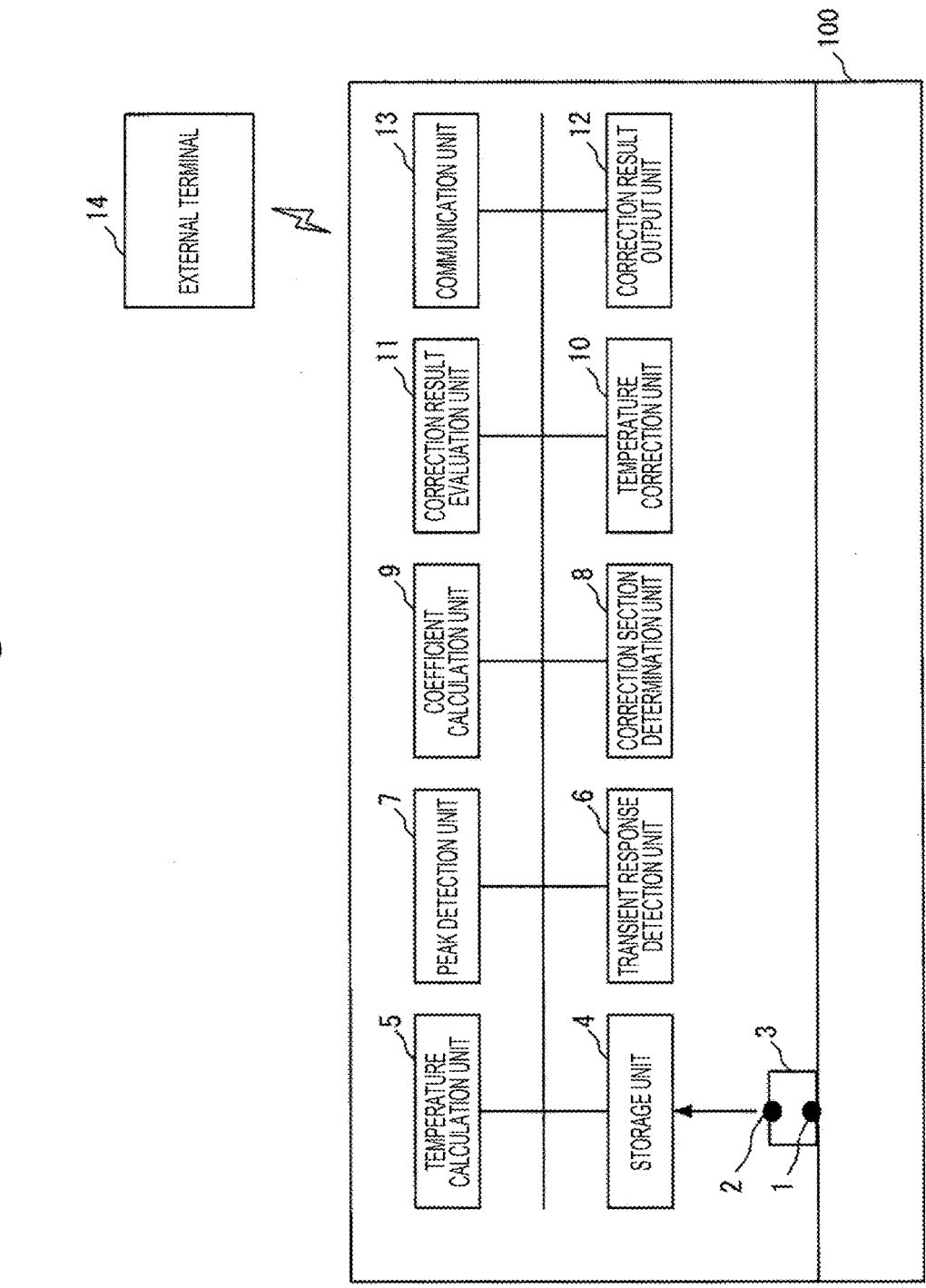
FIG. 1 is a block diagram illustrating a configuration of a temperature estimation apparatus according to an embodiment of the present invention.

Hereinafter, embodiments of the present invention will be described with reference to the drawings. FIG. 1 is a block diagram illustrating a configuration of a temperature estimation apparatus according to an embodiment of the present invention. The temperature estimation apparatus includes: a temperature sensor 1 that measures a skin surface temperature $T_s$ of a living body 100 (test subject); a temperature sensor 2 that measures a temperature $T_{top}$ at a position away from the living body 100; a heat insulating material 3 that holds the temperature sensor 1 and the temperature sensor 2; a storage unit 4 for storing data; a temperature calculation unit 5 that calculates a core body temperature $T_{cbt}$ (internal temperature) of the living body 100; a transient response detection unit 6 that detects a starting point of time of transient response of the core body temperature $T_{cbt}$; a peak detection unit 7 that detects a peak of the core body temperature $T_{cbt}$ during a transient response; a correction section determination unit 8 that determines a correction section of the core body temperature $T_{cbt}$ for each of a plurality of model functions that model a change in the core body temperature $T_{cbt}$ during the transient response; a coefficient calculation unit 9 that obtains a coefficient of each of the plurality of model functions regarding a part of a coefficient calculation section from a starting point of time of transient response until a predetermined transient response convergence evaluation time elapses; a temperature correction unit 10 that calculates a result of correcting the core body temperature $T_{cbt}$ in the correction section using each of the plurality of model functions; a correction result evaluation unit 11 that evaluates a correction result from the temperature correction unit 10; a correction result output unit 12 that replaces data in the correction section among time-series data of the core body temperature $T_{cbt}$ with a correction result determined to be the best by the correction result evaluation unit 11; and a communication unit 13 that transmits a calculation result of the core body temperature $T_{cbt}$ to an external terminal 14.

The temperature estimation apparatus is disposed such that the heat insulating material 3 comes into contact with the skin of the living body 100. The temperature sensor 1 is provided on the surface of the heat insulating material 3 on the living body side. The temperature sensor 2 is provided on the surface of the heat insulating material 3 opposite to the surface on the living body side so as to be in contact with air. The heat insulating material 3 holds the temperature sensor 1 and the temperature sensor 2 and serves as a resistor against heat flowing into the temperature sensor 1.

Figure 2:
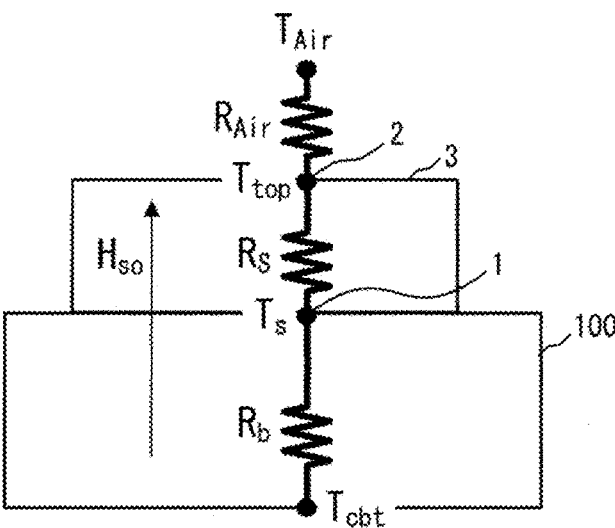
FIG. 2 is a diagram illustrating a thermal equivalent circuit model of a heat insulating material, a temperature sensor, and a living body according to an embodiment of the present invention.
Figure 11:
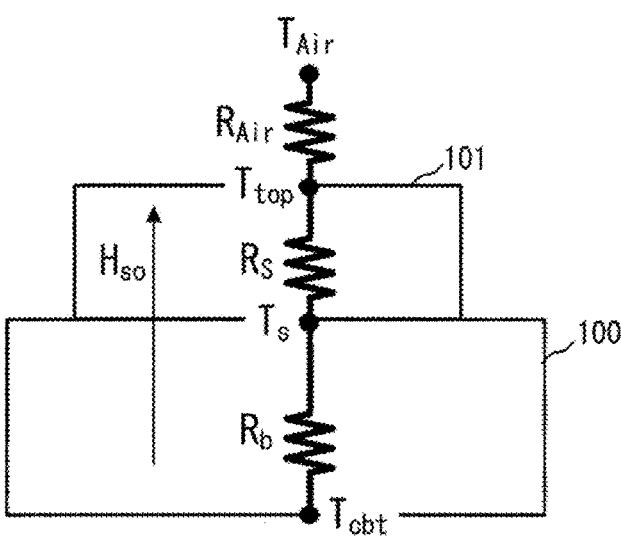
FIG. 11 is a diagram illustrating a thermal equivalent circuit model of a living body and a sensor.
Figure 12:
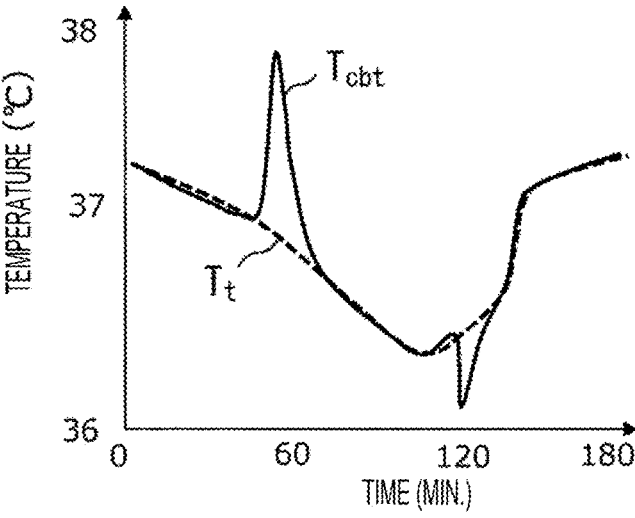
FIG. 12 is a diagram illustrating a comparison result between a true core body temperature and an estimated temperature when wind is blown to a living body by an electric fan.

FIG. 2 is a diagram illustrating a thermal equivalent circuit model of the temperature sensors 1 and 2, the heat insulating material 3, and the living body 100. Since the thermal equivalent circuit model in the present embodiment is similar to that in the conventional art, description will be given by using the same reference signs as those in FIG. 11.

FIG. 3 is a flowchart for describing an operation of the temperature estimation apparatus of the present embodiment. The temperature sensor 1 measures the skin surface temperature $T_s$ of the living body 100 (step S100 in FIG. 3). The temperature sensor 2 measures the temperature $T_{top}$ at a position away from the living body 100 (step S101 in FIG. 3). The measurement data of the temperature sensors 1 and 2 is stored in the storage unit 4.

The temperature calculation unit 5 calculates $T_s - T_{top}$ as the heat flux $H_{so}$ of the skin surface (step S102 in FIG. 3).

$$\text{Equation 3: } H_{so} = T_s - T_{top} \qquad (3)$$

Then, the temperature calculation unit 5 calculates the core body temperature $T_{cbt}$ of the living body 100 using Equation 1 (step S103 in FIG. 3). The thermal resistance $R_b$ of the living body 100 is stored in advance in the storage unit 4. The data of the core body temperature $T_{cbt}$ calculated by the temperature calculation unit 5 is stored in the storage unit 4.

Next, the peak detection unit 7 calculates a time derivative $dT_{cbt}/dt$ of the core body temperature $T_{cbt}$ calculated by the temperature calculation unit 5 (step S104 in FIG. 3).

The transient response detection unit 6 calculates a standard deviation $\sigma_{cbt}$ of the core body temperature $T_{cbt}$ calculated by the temperature calculation unit 5 (step S105 in FIG. 3). For the standard deviation $\sigma_{cbt}$, for example, it is sufficient if the standard deviation for the immediately preceding 5 to 10 minutes is calculated.

Next, the transient response detection unit 6 compares a difference $T_{cbt} - \mu$ between the core body temperature $T_{cbt}$ calculated by the temperature calculation unit 5 and, for example, an average value $\mu$ of the core body temperature $T_{cbt}$ for the immediately preceding 5 to 10 minutes with a threshold value $TH_{cbt}$ (step S106 in FIG. 3). The threshold value $TH_{cbt}$ is, for example, a value $3\sigma_{cbt}$ three times the standard deviation $\sigma_{cbt}$. Thus, the processing of steps S100 to S106 is performed at regular time intervals until $T_{cbt} - \mu$ exceeds $TH_{cbt}$ or falls below $-TH_{cbt}$.

When $T_{cbt} - \mu$ exceeds $TH_{cbt}$ or falls below $-TH_{cbt}$ (YES in step S106), the transient response detection unit 6 determines that a starting point of time of transient response of the core body temperature $T_{cbt}$ been detected, and sets the core body temperature $T_{cbt}$ at this time as a core body temperature $T_{cbt\_start}$ at the starting point of time of the transient response. Furthermore, the transient response detection unit 6 sets current time t at which the core body temperature $T_{cbt}$ exceeds the threshold value $TH_{cbt}$ as time $t_{\_start}$ at which the transient response starts (step S107 in FIG. 3).

The temperature estimation apparatus performs the above processing of steps S100 to S107 at regular time intervals, for example, until there is an instruction to end the measurement from the user (YES in step S108 in FIG. 3).

Figure 4:
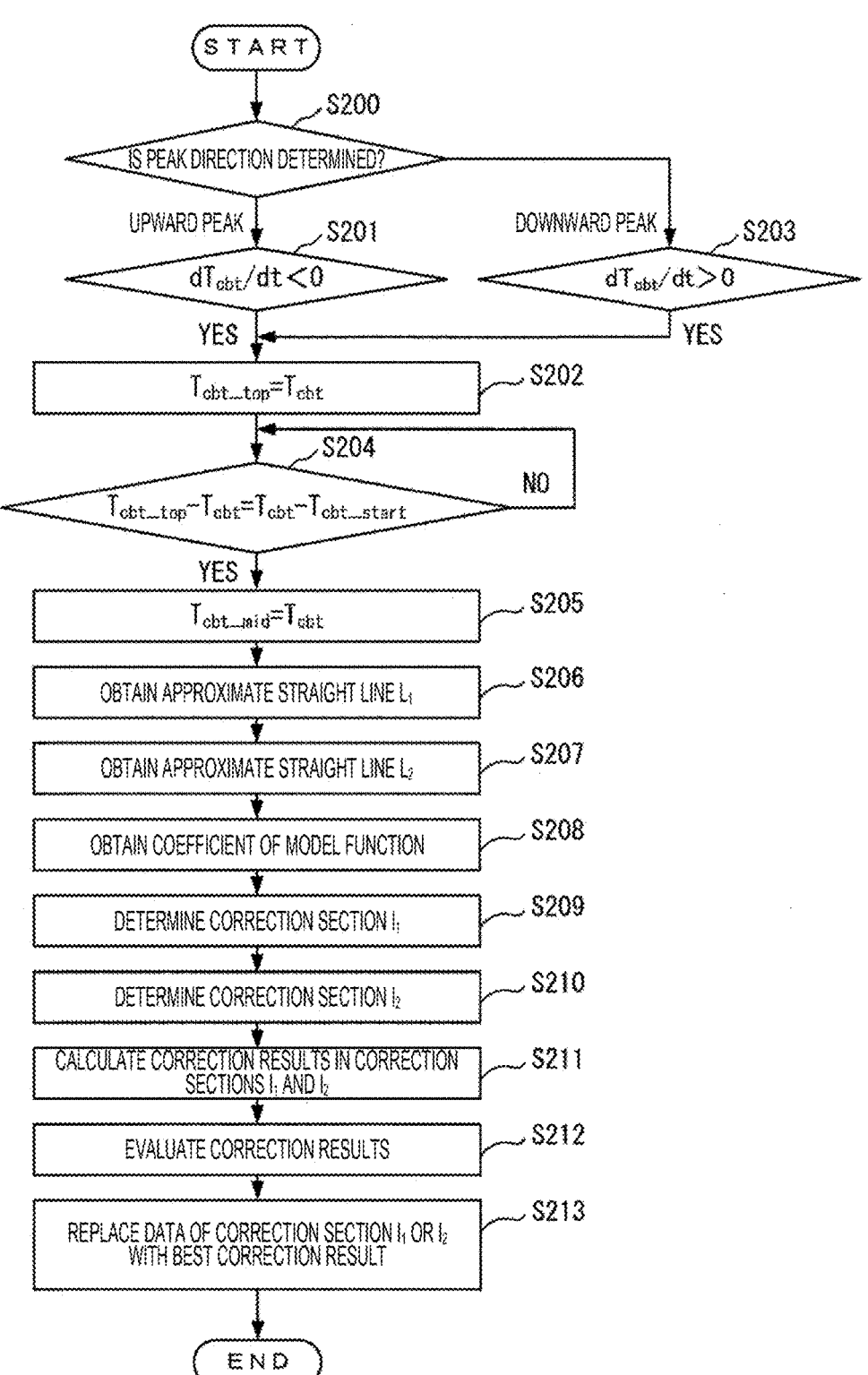
FIG. 4 is a flowchart for describing correction processing for core body temperature when a transient response of the core body temperature is detected by a transient response detection unit according to an embodiment of the present invention.
Figure 5:
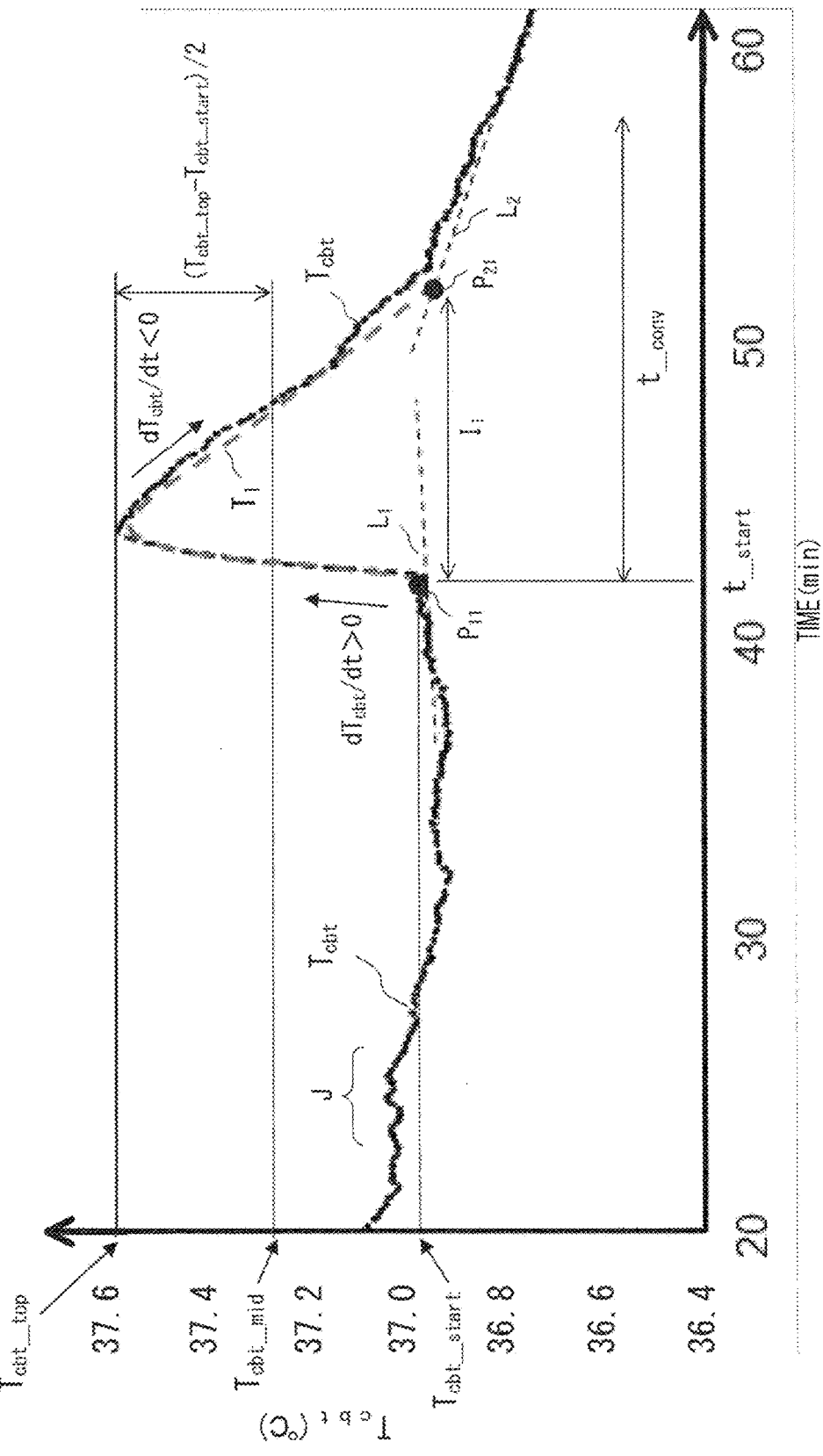
FIG. 5 is a diagram illustrating one example of the core body temperature.
Figure 6A:
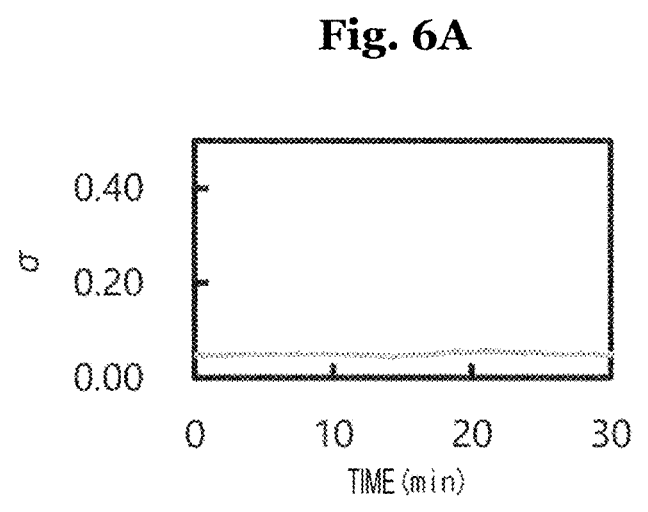
Figure 6B:
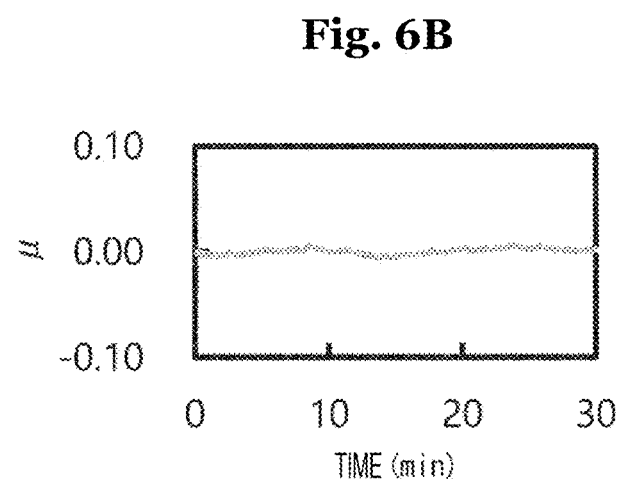

FIG. 4 is a flowchart for describing correction processing for the core body temperature $T_{cbt}$ when a transient response of the core body temperature $T_{cbt}$ is detected by the transient response detection unit 6, and FIG. 5 is a diagram illustrating one example of the core body temperature $T_{cbt}$. When there is no change in the wind blown to the living body 100 or the external air temperature, the core body temperature $T_{cbt}$ obtained from Equation 1 follows a normal distribution $N(\mu, \sigma)$. For example, a standard deviation $\sigma$ and an average $\mu$ for a section J in FIG. 5 are as illustrated in FIGS. 6A and 6B.

However, when the wind blown to the living body 100 or the external air temperature changes, the error distribution of the core body temperature $T_{cbt}$ changes. The temperature change when the wind blown to the living body 100 changes is dominated by heat conduction from the surface and heat flux due to convection. It is generally known that the temperature T changes as indicated in Equation 4 due to heat conduction, and the temperature T changes as indicated in Equation 5 due to heat flux.

Equations 4 and 5:

$$T \sim T0 + A \operatorname{erfc}\left(\frac{C}{\sqrt{t}}\right) \qquad (4)$$

$$T \sim T0 + B\sqrt{t} \qquad (5)$$

In Equations 4 and 5, To is an initial value of the temperature T, t is time, and erfc( ) is a complementary error function. By combining Equations 4 and 5, a temperature (hereinafter, $T_1$) during a transient response when the wind blown to the living body 100 changes can be expressed as Equation 6.

Equation 6:

$$T_1 = A_1 \operatorname{erfc}\left(\frac{B_1}{\sqrt{t}}\right) - C_1 \sqrt{t} + D_1 \qquad (6)$$

Further, a temperature (hereinafter, $T_2$) during a transient response when the external air temperature suddenly changes can be expressed as Equation 7 by arranging Equation 4.

Equation 7:

$$T_2 = A_2 \operatorname{erfc}\left(\frac{B_2}{\sqrt{t}}\right) - C_2 \operatorname{erfc}\left(\frac{D_2}{\sqrt{t}}\right) + E_2 \qquad (7)$$

Equation 6 indicates a model function that models a change $T_1$ in the core body temperature during a transient response when the wind blown to the living body 100 changes. Further, Equation 7 indicates a model function that models a change $T_2$ in the core body temperature during a transient response when the external air temperature has changed. $A_1$, $A_2$, $B_1$, $B_2$, $C_1$, $C_2$, $D_1$, $D_2$, and $E_2$ in Equations 6 and 7 are coefficients relating to the strength of the wind, the thermophysical properties of the living body 100, and the thermophysical properties of the temperature sensors 1 and 2. As described above, when there is no change in the wind blown to the living body 100 or the external air temperature, the core body temperature $T_{cbt}$ follows the normal distribution $N(\mu,\sigma)$, but when the wind blown the living body 100 or the external air temperature changes, the error distribution of the core body temperature $T_{cbt}$ changes by Equation 6 or 7. Therefore, when the core body temperature $T_{cbt}$ is corrected on the basis of Equation 6 or 7 regarding the section of the transient response, the influence of the wind and the external air temperature can be removed.

First, the peak detection unit 7 refers to the time-series data of the core body temperature $T_{cbt}$ stored in the storage unit 4, and determines the peak direction of the core body temperature $T_{cbt}$ by the time derivative $dT_{cbt}/dt$ of $T_{cbt}$ after the time point when the transient response of the core body temperature $T_{cbt}$ is detected by the transient response detection unit 6 (step S200 in FIG. 4). When $dT_{cbt}/dt>0$, that is, when the time derivative $dT_{cbt}/dt$ of the core body temperature $T_{cbt}$ after the starting point of time of the transient response $t_{\_start}$ is positive as in the example of FIG. 5, the peak detection unit 7 determines that it is an upward peak. Further, when $dT_{cbt}/dt<0$, that is, when the time derivative $dT_{cbt}/dt$ of the core body temperature $T_{cbt}$ after the starting point of time of the transient response $t_{\_start}$ is negative, the peak detection unit 7 determines that it is a downward peak.

When the peak detection unit 7 determines that it is an upward peak, the peak detection unit 7 detects a point at which the time derivative $dT_{cbt}/dt$ changes to negative. When detecting a point at which the time derivative $dT_{cbt}/dt$ changes to negative (YES in step S201 in FIG. 4), the peak detection unit 7 sets the core body temperature $T_{cbt}$ at this time as a peak value $T_{cbt\_top}$ (step S202 in FIG. 4).

Further, when the peak detection unit 7 determines that it is a downward peak, the peak detection unit 7 detects a point at which the time derivative $dT_{cbt}/dt$ changes to positive. When detecting a point at which the time derivative $dT_{cbt}/dt$ changes to positive (YES in step S203 in FIG. 4), the peak detection unit 7 sets the core body temperature $T_{cbt}$ at this time as a peak value $T_{cbt\_top}$ (step S202).

Next, the coefficient calculation unit 9 refers to the time-series data of the core body temperature $T_{cbt}$ stored in the storage unit 4, and detects a value with which $T_{cbt\_top}-T_{cbt}=T_{cbt}-T_{cbt\_start}$ is established within the core body temperature $T_{cbt}$ after $T_{cbt\_top}$, that is, an intermediate value $T_{cbt\_}$ between the peak value $T_{cbt\_top}$ of the core body temperature and the core body temperature $T_{cbt\_start}$ at the starting point of time of the transient response (step S204 in FIG. 4). The coefficient calculation unit 9 sets the detected intermediate value $T_{cbt\_}$ as $T_{cbt\_mid}$ (step S205 in FIG. 4).

Subsequently, the correction section determination unit 8 refers to the time-series data of the core body temperature $T_{cbt}$ stored in the storage unit 4, and obtains an approximate straight line $L_1$ of the core body temperature $T_{cbt}$ immediately before the starting point of time of the transient response (step S206 in FIG. 4). In practice, it is sufficient if the correction section determination unit 8 obtains an approximate straight line of the core body temperature $T_{cbt}$ in a section from a time point a predetermined time $t_1$ (for example, several minutes) before the starting point of time of transient response $t_{\_start}$ to immediately before the starting point of time of the transient response $t_{\_start}$.

Furthermore, the correction section determination unit 8 refers to the time-series data of the core body temperature $T_{cbt}$ stored in the storage unit 4, and obtains an approximate straight line $L_2$ of the core body temperature $T_{cbt}$ after a prescribed transient response convergence evaluation time $t_{\_conv}$ from the core body temperature $T_{cbt\_start}$ at the starting point of time of the transient response (step S207 in FIG. 4). In practice, it is sufficient if the correction section determination unit 8 obtains an approximate straight line of the core body temperature $T_{cbt}$ in a section from a time point after $t_{\_conv}$ from the starting point of time of the transient response $t_{\_start}$ until a predetermined time t2 (for example, several minutes) elapses. $t_{\_conv}$ is, for example, about 30 minutes.

Next, the coefficient calculation unit 9 refers to the time-series data of the core body temperature $T_{cbt}$ stored in the storage unit 4, and uses the time-series data of the core body temperature $T_{cbt}$ of the coefficient calculation section from the intermediate value $T_{cbt\_mid}$ to the peak value $T_{cbt\_top}$ to obtain the coefficients $A_1$, $B_1$, $C_1$, and $D_1$ of the model function of Equation 6 so as to minimize the difference between the core body temperature $T_{cbt}$ and an output $T_1$ of the model function (step S208 in FIG. 4). Note that although there is a section from the peak value $T_{cbt\_top}$ to the intermediate value $T_{cbt\_mid}$, it is sufficient if the coefficient calculation section is a section before the peak value $T_{cbt\_top}$.

Similarly, the coefficient calculation unit 9 uses the time-series data of the core body temperature $T_{cbt}$ of the coefficient calculation section from the intermediate value $T_{cbt\_mid}$ to the peak value $T_{cbt\_top}$ to obtain the coefficients $A_2$, $B_2$, $C_2$, $D_2$, and $E_2$ of the model function of Equation 7 so as to minimize the difference between the core body temperature $T_{cbt}$ and an output $T_2$ of the model function (step S208).

Next, the correction section determination unit 8 obtains an intersection point $P_{11}$ of the approximate straight line $L_1$ and the output $T_1$ of the model function of Equation 6 and an intersection point $P_{21}$ of the approximate straight line $L_2$ and the output $T_1$ of the model function, and sets a section from the intersection point $P_{11}$ to the intersection point $P_{21}$ as a correction section $I_1$ for the model function of Equation 6 (step S209 in FIG. 4).

Further, the correction section determination unit 8 obtains an intersection point $P_{12}$ of the approximate straight line $L_1$ and the output $T_2$ of the model function of Equation 7 and an intersection point $P_{22}$ of the approximate straight line $L_2$ and the output $T_2$ of the model function, and sets a section from the intersection point $P_{12}$ to the intersection point $P_{22}$ as a correction section $I_2$ for the model function of Equation 7 (step S210 in FIG. 4).

Note that, in the example of FIG. 5, a case where the correction section $I_1$ is obtained for the model function of Equation 6 is described.

Next, the temperature correction unit 10 calculates a result of correcting the core body temperature $T_{cbt}$ using the model function of Equation 6 in the correction section $I_1$ determined by the correction section determination unit 8 (step S211 in FIG. 4). When Equation 6 is used, the corrected core body temperature $T'_{cbt}$ is expressed by Equation 8. Equation 8 means that the time-series data of the core body temperature $T_{cbt}$ in the correction section $I_1$ is corrected for each time by the time-series data of the output $T_1$ of the model function of Equation 6.

$$\text{Equation 8: } T'_{cbt}=T_{cbt}-T_1 \tag{8}$$

Further, the temperature correction unit 10 calculates a result of correcting the core body temperature $T_{cbt}$ using the model function of Equation 7 in the correction section $I_2$ determined by the correction section determination unit 8 (step S211). When Equation 7 is used, the corrected core body temperature $T'_{cbt}$ is expressed by Equation 9. Equation 9 means that the time-series data of the core body temperature $T_{cbt}$ in the correction section $I_2$ is corrected for each time by the time-series data of the output $T_2$ of the model function of Equation 7.

$$\text{Equation 9: } T'_{cbt}=T_{cbt}-T_2 \tag{9}$$

Next, the correction result evaluation unit 11 evaluates the correction result from the temperature correction unit 10 (step S212 in FIG. 4). For example, the correction result evaluation unit 11 calculates an evaluation value for each of the correction result using the model function of Equation 6 and the correction result using the model function of Equation 7. As the evaluation value, for example, it is sufficient if $\int\sigma^2 dt$ indicating the degree of variation in the correction result is calculated. Then, the correction result evaluation unit 11 sets, as the best correction result, a correction result having the minimum evaluation value from the correction result using the model function of Equation 6 and the correction result using the model function of Equation 7.

The correction result output unit 12 replaces the data of the correction section $I_1$ or $I_2$ among the time-series data of the core body temperature $T_{cbt}$ stored in the storage unit 4 with the correction result determined to be the best by the correction result evaluation unit 11 (step S213 in FIG. 4).

When it is determined that the correction result using the model function of Equation 6 is the best, the correction result output unit 12 replaces the time-series data of the core body temperature $T_{cbt}$ in the correction section $I_1$ with the time-series data of the correction result $T'_{cbt}$ using the model function of Equation 6. Further, when it is determined that the correction result using the model function of Equation 7 is the best, the correction result output unit 12 replaces the time-series data of the core body temperature $T_{cbt}$ in the correction section $I_2$ with the time-series data of the correction result $T'_{cbt}$ using the model function of Equation 7. Thus, the correction of the core body temperature $T_{cbt}$ ends.

Figure 7A:
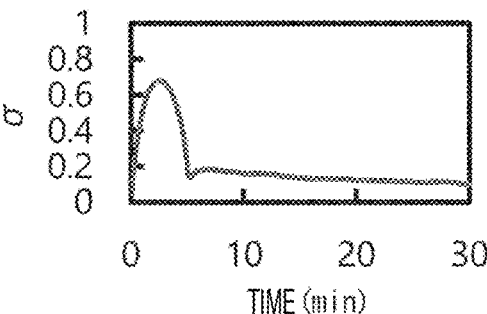
FIGS. 7A and 7B are diagrams illustrating one example of a standard deviation and an average of a core body temperature in a correction section.
Figure 7B:
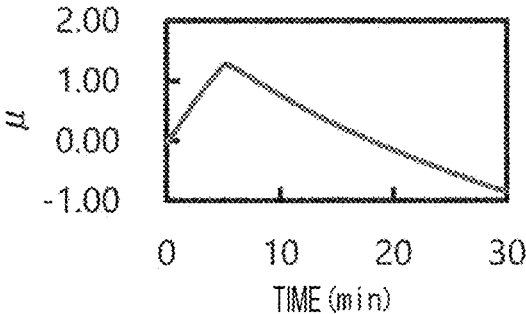

For example, a standard deviation $\sigma$ and an average $\mu$ of the core body temperature $T_{cbt}$ for the correction section are as illustrated in FIGS. 7A and 7B. In the correction section, the standard deviation $\sigma$ becomes not constant, and the average $\mu$ also deviates from the original core body temperature.

Figure 8A:
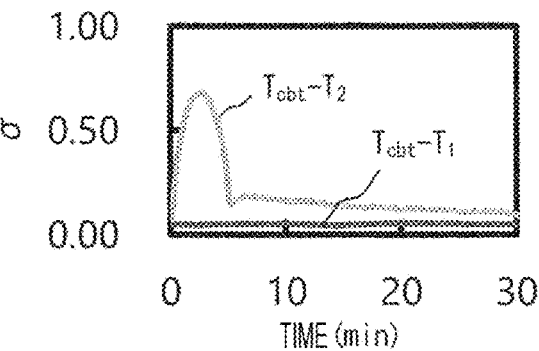
FIGS. 8A and 8B are diagrams illustrating one example of a standard deviation and an average of a core body temperature after correction.
Figure 8B:
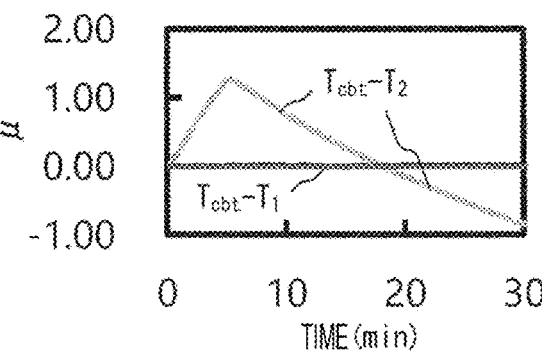

On the other hand, the standard deviation $\sigma$ and the average $\mu$ of the correction results using the model functions of Equations 6 and 7 are as illustrated in FIGS. 8A and 8B. In FIGS. 8A and 8B, it can be seen that the standard deviation $\sigma$ and the average $\mu$ are values in a case where there is no disturbance (change in wind or external air temperature) by the model function of Equation 6.

The communication unit 13 of the temperature estimation apparatus transmits the time-series data of the corrected core body temperature to the external terminal 14. The external terminal 14 including a personal computer (PC) or a smartphone displays the value of the core body temperature received from the temperature estimation apparatus.

Figure 9:
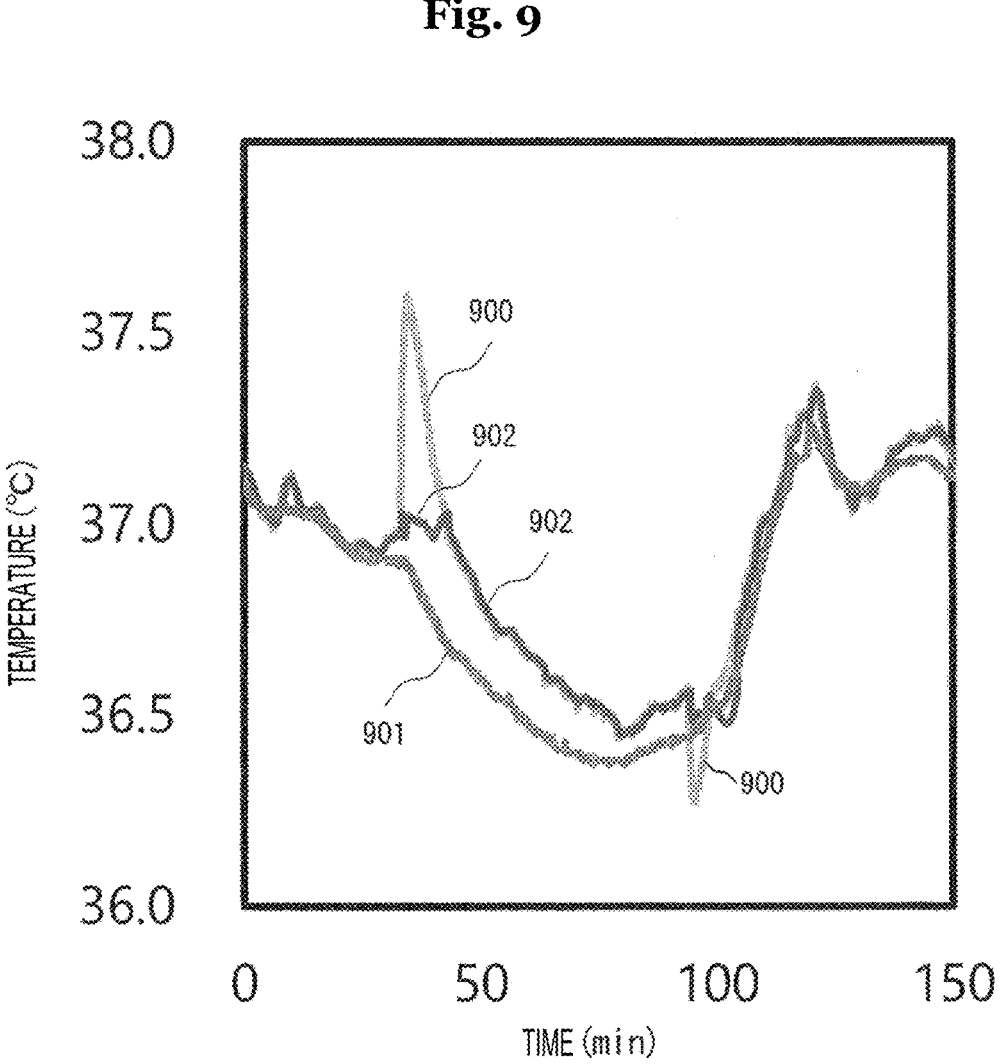
FIG. 9 is a diagram illustrating a core body temperature estimated by the temperature estimation apparatus according to an embodiment of the present invention and an eardrum temperature measured by an eardrum thermometer.

FIG. 9 illustrates the core body temperature estimated in the present example and the core temperature (eardrum temperature) measured by the eardrum thermometer for comparison. Here, the core body temperature of the living body 100 is measured while the wind of the fan is directly blown to the living body 100. In FIG. 9, reference numeral 900 denotes the core body temperature $T_{cbt}$ calculated by the temperature calculation unit 5, reference numeral 901 denotes the eardrum temperature, and reference numeral 902 denotes the core body temperature after correction according to the present embodiment. As can be seen from FIG. 9, a transient error due to the occurrence of convection is reduced, and a temperature estimation error is suppressed to ±0.1° C. or less.

Figure 10:
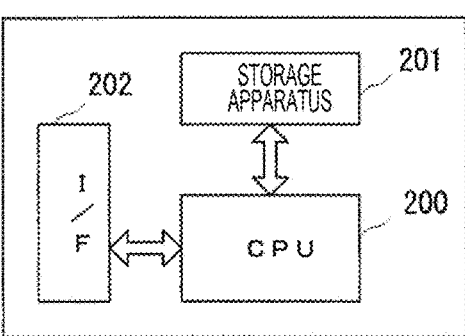
FIG. 10 is a block diagram illustrating a configuration example of a computer that realizes the temperature estimation apparatus according to an embodiment of the present invention.

The temperature calculation unit 5, the transient response detection unit 6, the peak detection unit 7, the correction section determination unit 8, the coefficient calculation unit 9, the temperature correction unit 10, the correction result evaluation unit 11, the correction result output unit 12, and the communication unit 13 described in the present embodiment can be realized by a computer including a central processing unit (CPU), a storage apparatus, and an interface, and a program for controlling these hardware resources. A configuration example of the computer is illustrated in FIG. 10.

The computer includes a CPU 200, a storage apparatus 201, and an interface apparatus (I/F) 202. Hardware and the like of the temperature sensors 1 and 2 and the communication unit 13 are connected to the I/F 202. In such a computer, the temperature estimation program for realizing the temperature estimation method of embodiments of the present invention is stored in the storage apparatus 201. The CPU 200 executes the processing described in the present embodiment in accordance with the program stored in the storage apparatus 201.

INDUSTRIAL APPLICABILITY

Embodiments of the present invention can be applied to a technique for estimating an internal temperature of a test subject such as a living body.

REFERENCE SIGNS LIST

1, 2 Temperature sensor
3 Heat insulating material
4 Storage unit
5 Temperature calculation unit
6 Transient response detection unit
7 Peak detection unit
8 Correction section determination unit
9 Coefficient calculation unit
10 Temperature correction unit
11 Correction result evaluation unit
12 Correction result output unit
13 Communication unit
14 External terminal

The invention claimed is:

1. A temperature estimation method, the method comprising:

measuring a temperature of a surface of a test subject using a first temperature sensor;

measuring a temperature at a position away from the test subject using a second temperature sensor;

calculating an internal temperature of the test subject based on the temperature of the surface of the test subject and the temperature at the position away from the test subject;

detecting a starting point of time of a transient response of the internal temperature;

obtaining coefficients of each of a plurality of model functions that model a change in the internal temperature during the transient response for a part of a coefficient calculation section from the starting point of time of the transient response until a predetermined transient response convergence evaluation time elapses;

determining a correction section of the internal temperature for each of the plurality of model functions;

calculating results of correcting the internal temperature in the correction section using each of the plurality of model functions;

evaluating the results of correcting the internal temperature to determine a most preferred correction result from the results and select the correction section for the model function among the plurality of model functions that yielded the most preferred correction result; and replacing data in the selected correction section among time-series data of the internal temperature with the most preferred correction result.

2. The method according to claim 1, wherein the plurality of model functions comprises:

a first model function that models a change in the internal temperature during the transient response in which wind blown to the test subject has changed; and a second model function that models a change in the internal temperature during the transient response in which external air temperature has changed.

3. The method according to claim 2, wherein obtaining the coefficients of each of the plurality of model functions comprises obtaining the coefficient that minimizes a difference between the internal temperature and an output of the model function for each of the plurality of model functions.

4. The method according to claim 3, wherein the coefficient calculation section is a section from an intermediate value between a peak value of the internal temperature and the internal temperature at the starting point of time of the transient response to the peak value.

5. The method according to claim 4, wherein determining the correction section of the internal temperature for each of the plurality of model functions comprises:

obtaining a first approximate straight line of the internal temperature immediately before the starting point of time of the transient response and a second approximate straight line of the internal temperature from the starting point of time of the transient response until a transient response convergence evaluation time lapses; and regarding each of the plurality of model functions, setting a section between two intersection points of the first and the second approximate straight lines and an output of the model function as the correction section.

6. The method according to claim 5, wherein evaluating the results of correcting the internal temperature comprises:

calculating an evaluation value for each of the results of correcting using the plurality of model functions; and setting a minimum evaluation value as the most preferred correction result.

7. The method according to claim 1, wherein obtaining the coefficients of each of the plurality of model functions comprises obtaining the coefficient that minimizes a difference between the internal temperature and an output of the model function for each of the plurality of model functions.

8. The method according to claim 1, wherein the coefficient calculation section is a section from an intermediate value between a peak value of the internal temperature and the internal temperature at the starting point of time of the transient response to the peak value.

9. The method according to claim 1, wherein determining the correction section of the internal temperature for each of the plurality of model functions comprises:

obtaining a first approximate straight line of the internal temperature immediately before the starting point of time of the transient response and a second approximate straight line of the internal temperature from the starting point of time of the transient response until a transient response convergence evaluation time lapses; and regarding each of the plurality of model functions, setting a section between two intersection points of the first and the second approximate straight lines and an output of the model function as the correction section.

10. The method according to claim 1, wherein evaluating the results of correcting the internal temperature comprises:

calculating an evaluation value for each of the results of correcting using the plurality of model functions; and setting a minimum evaluation value as the most preferred correction result.

11. A non-transitory computer-readable storage medium storing a temperature estimation program that, when executed by a computer, causes the computer to execute steps of:

calculating an internal temperature of a test subject based on a temperature of a surface of the test subject and a temperature at a position away from the test subject;

detecting a starting point of time of a transient response of the internal temperature;

obtaining coefficients of each of a plurality of model functions that model a change in the internal temperature during the transient response for a part of a coefficient calculation section from the starting point of time of the transient response until a predetermined transient response convergence evaluation time elapses;

determining a correction section of the internal temperature for each of the plurality of model functions;

calculating results of correcting the internal temperature in the correction section using each of the plurality of model functions;

evaluating the results of correcting the internal temperature to determine a most preferred correction result from the results and select the correction section for the model function among the plurality of model functions that yielded the most preferred correction result; and replacing data in the selected correction section among time-series data of the internal temperature with the most preferred correction result.

12. A temperature estimation apparatus, the apparatus comprising:

a first temperature sensor configured to measure a temperature of a surface of a test subject;

a second temperature sensor configured to measure a temperature at a position away from the test subject;

a temperature calculation circuit configured to calculate an internal temperature of the test subject based on the temperature of the surface of the test subject and the temperature at the position away from the test subject;

a transient response detection circuit configured to detect a starting point of time of a transient response of the internal temperature;

a coefficient calculation circuit configured to obtain coefficients of each of a plurality of model functions that model a change in the internal temperature during the transient response for a part of a coefficient calculation section from the starting point of time of the transient response until a predetermined transient response convergence evaluation time elapses;

a correction section determination circuit configured to determine a correction section of the internal temperature for each of the plurality of model functions;

a temperature correction circuit configured to calculate results of correcting the internal temperature in the correction section using each of the plurality of model functions;

a correction result evaluation circuit configured to evaluate the results of correcting the internal temperature from the temperature correction circuit to determine a most preferred correction result from the results and select the correction section for the model function among the plurality of model functions that yielded the most preferred correction result; and a correction result output circuit configured to replace data in the selected correction section among time-series data of the internal temperature with the most preferred correction result.

13. The apparatus according to claim 12, wherein the plurality of model functions comprises:

a first model function that models a change in the internal temperature during the transient response in which wind blown to the test subject has changed; and a second model function that models a change in the internal temperature during the transient response in which external air temperature has changed.

14. The apparatus according to claim 12, wherein, to obtain the coefficients of each of the plurality of model functions, the coefficient calculation circuit is configured to obtain the coefficient that minimizes a difference between the internal temperature and an output of the model function for each of the plurality of model functions.

15. The apparatus according to claim 12, wherein the coefficient calculation section is a section from an intermediate value between a peak value of the internal temperature and the internal temperature at the starting point of time of the transient response to the peak value.

16. The apparatus according to claim 12, wherein, to determine the correction section of the internal temperature for each of the plurality of model functions, the correction section determination circuit is configured to:

obtain a first approximate straight line of the internal temperature immediately before the starting point of time of the transient response and a second approximate straight line of the internal temperature from the starting point of time of the transient response until a transient response convergence evaluation time lapses; and regarding each of the plurality of model functions, set a section between two intersection points of the first and the second approximate straight lines and an output of the model function as the correction section.

17. The apparatus according to claim 12, wherein, to evaluate the results of correcting the internal temperature, the correction result evaluation circuit is configured to:

calculate an evaluation value for each of the results of correcting using the plurality of model functions; and set a minimum evaluation value as the most preferred correction result.

* * * * *